(12) United States Patent
Lier

(10) Patent No.: US 9,804,411 B1
(45) Date of Patent: Oct. 31, 2017

(54) ADHESION STRUCTURES FOR EYEGLASS FRAMES

(71) Applicant: Erik Lier, Newtown, PA (US)

(72) Inventor: Erik Lier, Newtown, PA (US)

( * ) Notice: Subject to any disclaimer, the term of this patent is extended or adjusted under 35 U.S.C. 154(b) by 0 days.

(21) Appl. No.: 15/232,804

(22) Filed: Aug. 9, 2016

(51) Int. Cl.
*G02C 5/12* (2006.01)
*G02C 5/00* (2006.01)

(52) U.S. Cl.
CPC ............... *G02C 5/12* (2013.01); *G02C 5/008* (2013.01); *G02C 2200/16* (2013.01); *G02C 2200/20* (2013.01)

(58) Field of Classification Search
CPC ............ G02C 5/12; G02C 5/02; G02C 5/126
USPC .................................. 351/139, 136, 78, 138
See application file for complete search history.

(56) References Cited

U.S. PATENT DOCUMENTS

| | | | |
|---|---|---|---|
| 675,595 A | 6/1901 | Gehring | |
| 2,021,890 A | 11/1935 | Grier | |
| 2,032,843 A | 3/1936 | Grier | |
| 2,390,523 A | 12/1945 | D'Orsay | |
| 2,561,402 A | 7/1951 | Nelson | |
| 3,049,973 A | 8/1962 | Moeller | |
| 4,165,925 A * | 8/1979 | Donovan | G02C 3/003 351/123 |
| 5,885,675 A | 3/1999 | Martin | |
| 2013/0321760 A1 | 12/2013 | Silverman | |

FOREIGN PATENT DOCUMENTS

CN 202837704 3/2013

\* cited by examiner

*Primary Examiner* — Hung Dang
(74) *Attorney, Agent, or Firm* — LaMorte & Associates, P.C.

(57) ABSTRACT

A skin contact pad for eyeglass frames that helps increase the friction between the skin and the eyeglasses. The skin contact pad has a body with a face surface that touches the skin of a person wearing the eyeglasses. Concavities are formed on the skin contact pad. Each of the concavities has a concave surface defined within an encompassing base. The encompassing base of each concavity is independent and complete. As the concavities move across skin, the skin bulges slightly into the concavities. As the skin moves under the concavities, the bulges move and a slight suction is created within the concavities that bias the skin contact pad toward the skin. The bias that is created helps hold the eyeglasses in place on the head of a user.

18 Claims, 7 Drawing Sheets

ADHESION STRUCTURES FOR EYEGLASS FRAMES

BACKGROUND OF THE INVENTION

1. Field of the Invention

In general, the present invention relates to the structure of eyeglasses and the elements on the eyeglasses that make physical contact with the skin of the person wearing the eyeglasses. More particularly, the present invention relates to the structure of nose pads and temple cushions present at the interfaces where eyeglasses touch the skin on a wearer.

2. Prior Art Statement

A typical set of eyeglasses contains a front frame that supports the lenses in front of the wearer's eyes. The front frames are typically held on the head using both temple elements and nose pads. The temple elements attach to the front frame at hinged joints. When unfolded about the hinged joints, the temple elements extend along the side of the wearer's head and pass over the top of the wearer's ears. It is mostly friction between the head and the temple elements that prevent the eyeglasses from falling away from the wearer's head. The temple elements may curve behind the ear to further ensure that the set of eyeglasses do not fall away from the wearer's head.

The nose pads are attached to the front frame under the bridge of the frames. The nose pads are positioned to touch the sides of the nose when the eyeglasses are worn. The nose pads bear the weight of the front frame and lenses. The nose pads may be molded as part of the front frame, or they may be mounted to flexible wire supports. The wire supports enable the orientation of the nose pads to be altered so that the nose pads make good contact with the surface of the nose.

The front frame of the eyeglasses are the heaviest part of the eyeglasses. Consequently, gravity biases the front frames downwardly. This typically causes the eyeglass frames to drift down along the length of the nose as a person moves his/her head. The nose pads counteract the bias of gravity. The nose pads bear much of the weight of the front frames and provide support in opposition to gravity. The nose pads transfer the weight of the front frame to the surface of the nose.

The problem is that the surfaces of most noses are curved surfaces that slant downwardly at a steep angle. Furthermore, the surfaces of the nose are relatively smooth. Additionally, the surfaces of the nose contain high concentrations of oil glands and sweat glands. Excretions from these glands make the skin of the nose slick, especially if the wearer begins to sweat. The support that a set of nose pads can provide is proportional to the friction that exists between the nose pads and the nose. If the coefficient of friction decreases significantly, due to the presence of oil and/or sweat, the nose pads will begin to slide down the nose. The wearer must then continuously push the eyeglasses back up the nose otherwise the eyeglasses will fall from the wearer's head.

A second function of nose pads is that they provide comfort. The nose pads enlarge the area of contact on the nose that bears the weight of the eyeglasses. As such, the nose pads cushion the weight of the eyeglasses and prevent the eyeglasses from pressing into the skin of the nose. It is for this reason that nose pads have a relatively large contact area. The large contact area spreads the weight of the eyeglasses along a wide area of the nose so that no one point becomes painful. However, it will be understood that the two purposes of the nose pads are diametrically opposed. A large surface area on nose pads makes the nose pads comfortable. However, the large area spreads the weight of the eyeglasses and therefore decreases the friction that exists between the nose pads and the skin of the nose. It will therefore be understood that when a designer is creating a set of eyeglasses, the designer must compromise. The nose pads must be made large enough to be comfortable, yet must be made small enough to maintain a sufficient degree of friction. Furthermore, the nose pads must be made aesthetically pleasing, so as to fit into the overall design of eyeglasses. This often dictates that the nose pads contact the sides of the nose where the nose is the most angled.

In the prior art, numerous attempts have been made to increase the coefficient of friction for nose pads without compromising the comfort of the nose pads. In U.S. Pat. No. 2,032,843, to Grier, texturing has been added to the surface of the nose pads that contacts the skin of the nose. The design, however, has complications. Due to the small area of nose pads on so many styles of eyeglasses, the change in friction created by the texturing is insignificant. As such, textured nose pads perform no better than traditional smooth nose pads. In U.S. Pat. No. 675,595 to Gehring, nose pads are shown that are configured with suction cups as nose pads. The nose pads are pressed against the skin, wherein the suction cups temporarily adhere to the skin of the nose with suction.

There are many problems with the suction cup design. Among the problems are that the suction cups only adhere to the skin for a short period of time before they release. This is due to the fact that the pores and lines of the skin make it impossible for an airtight seal to be created. Once the suction cup releases from the skin, it has a very small coefficient of friction. As such, the eyeglasses will rapidly begin to slide down the nose. This causes a wearer to reposition the eyeglasses and press the suction cups against the skin of the nose to create another temporary suction seal. The need to repeatedly reseat the suction cups is annoying to many people. Another problem associated with prior art nose pads having suction cups is one of aesthetics. Suction cups tend not to be aesthetically pleasing. Also, they are unusual to view. Accordingly, when speaking to a person wearing eyeglasses with suction cups, the observer's sight will inevitably be directed to the person's nose. Furthermore, the suction cups tend to create circular marks on the skin of the nose. As such, when the eyeglasses are removed, the marks on the nose of the wearer are unsightly and take a significant amount of time to fade.

A need therefore exists for an improved nose pad design, wherein the nose pad is small and aesthetically pleasing, yet provides a high coefficient of friction without marking the wearer's skin. This need is met by the present invention as described and claimed below.

SUMMARY OF THE INVENTION

The present invention is a skin contact pad for eyeglass frames that helps increase the friction between the skin and the eyeglasses. The pad can be positioned on the eyeglasses in any area that contacts the bare skin of a wearer. Most often, the pad is positioned in the nose pad and/or temple elements of the eyeglasses. However, with specialty glasses that contact the forehead, the pad can be positioned at the point of skin contact.

The skin contact pad has a body having a face surface that touches the skin of a person wearing the eyeglasses. A plurality of concavities are formed in an area of the skin contact pad. Each of the plurality of concavities has a concave surface defined within an encompassing base. The encompassing base of each concavity is independent and complete. That is, the concavities do not intersect or overlap. For each concavity, the encompassing base has a maximum diameter that is no greater than one millimeter, and is preferably much smaller. Furthermore, for each concavity, the concave surface has a depth that is no greater than half the maximum diameter of the encompassing base.

As the concavities move across skin, the skin bulges slightly into the concavities. As the skin moves under the concavities, the bulges move and a slight suction is created within the concavities that bias the skin contact pad toward the skin. The bias that is created helps hold the eyeglasses in place on the head of a user.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and method can be embodied in many ways, only a few embodiments have been selected for the purposes of illustration and discussion. The illustrated embodiments, however, are merely exemplary and should not be considered limitations when interpreting the scope of the claims.

Figure 1:
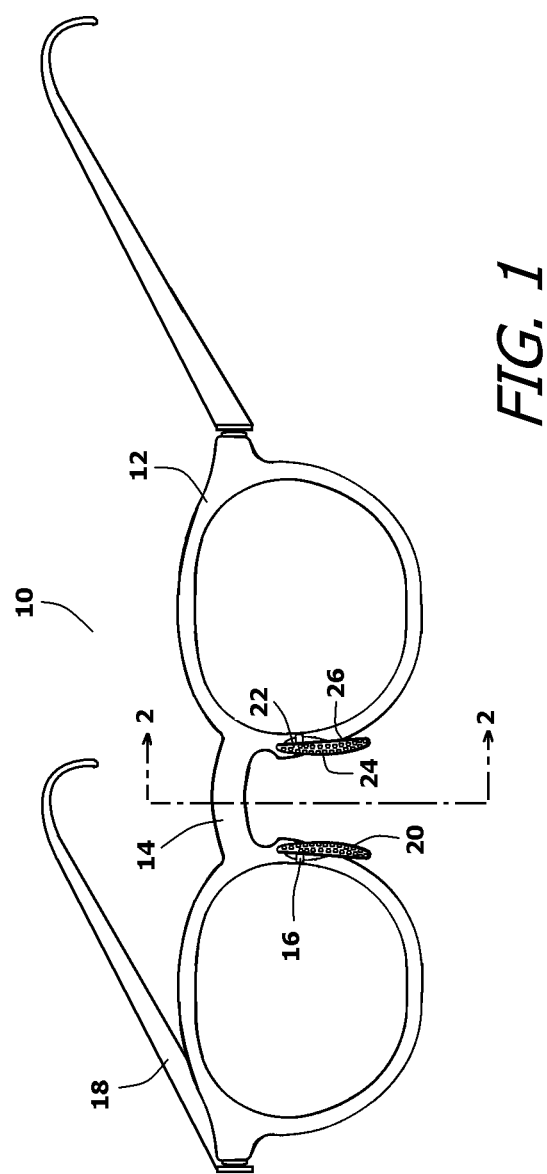
FIG. 1 is an exemplary schematic of eyeglasses embodying the present invention skin contact pads.

Referring to FIG. 1, a set of eyeglasses 10 is shown that contains a front frame 12 and a nose bridge 14. Nose pads 20 are coupled to the front frame 12 under the nose bridge 14. In the shown embodiment, the nose pads 20 are coupled to support wires 16. However, it will be understood that the nose pads 20 can be coupled directly to the front frame 12. Temple elements 18 are coupled to the front frame 12 to support the eyeglasses 10 over the wearer's ears.

Two nose pads 20 are provided. Each of the nose pads 20 has a body 22 that is supported by the support wire 16. The body 22 of each nose pad 20 has a face surface 24 and a rear surface 26. The rear surface 26 is connected to the support wire 16. The face surface 24 contacts the skin of the nose when the eyeglasses 10 are worn.

Figure 2:
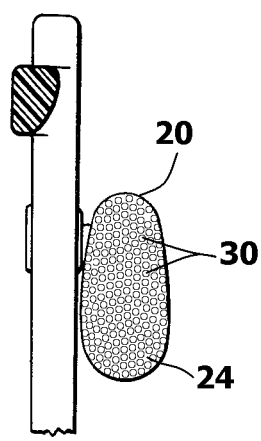
FIG. 2 is a fragmented cross-sectional view of the embodiment of FIG. 1, viewed along section line 2-2.
Figure 3:
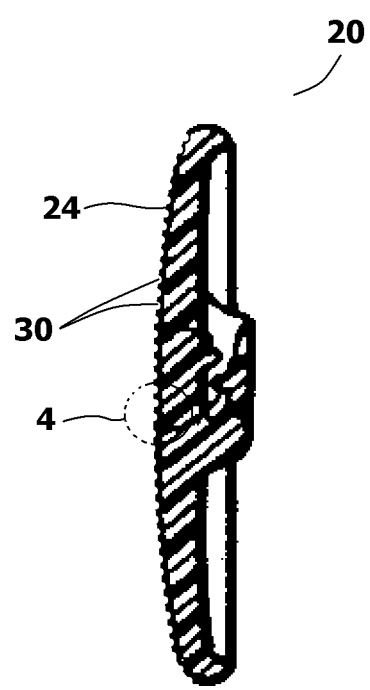
FIG. 3 shows a cross-sectional view of a nose pad.
Figure 4:
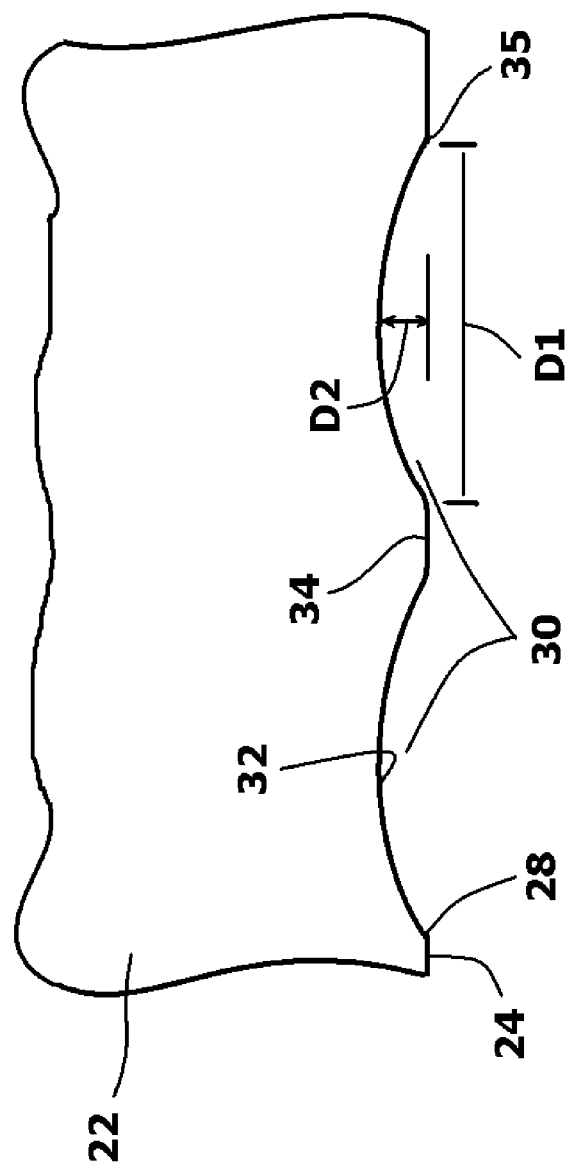
FIG. 4 shows an enlarged view of a section of FIG. 3.

Referring to FIG. 2 in conjunction with FIG. 3 and FIG. 4, it can be seen that the face surface 24 of the nose pad 20 is covered in a matrix of concavities 30. Each of the concavities 30 has an encompassing base 28 and a concave surface 32 that is inwardly domed about the encompassing base 28. The concave surface 32 is impervious to air.

The encompassing base 28 of each of the concavities 30 is preferably circular. However, the encompassing base 28 can be other rounded shapes, such as elliptical shapes or oblong shapes. Regardless, the encompassing base 28 has a maximum diameter D1 of between 0.01 mm and 1 mm, with a preferred maximum diameter between 0.05 mm and 0.3 mm. The concave surface 32 of each of the concavities 30 also has a shallow maximum depth D2. The depth D2 of each of the concavities 30 is preferably no greater than half the diameter D1 and is preferably no greater than one-quarter the diameter D1.

Each of the concavities 30 is isolated on the face surface 24 of the body 22. That is, none of the concavities 30 overlap. Rather, each of the concavities 30 has a complete and uninterrupted encompassing base 28. Accordingly, segments 34 of the face surface 24 exist between each of the concavities 30. The edges 35 where the segments 34 transition into the encompassing base 28 are rounded, but with a radius much smaller than half the diameter D1 to preserve the suction cup effect by avoid leak of air. As such, there are no sharp edges or surfaces on the face surface 24. Rather, the face surface 24 feels smooth even though it is dimpled with the matrix of concavities 30.

The concavities 30, are densely packed. As such, the segments 34 between adjacent concavities 30 are kept at a minimum. Preferably, the width of any segment 34 at the closest point between adjacent concavities 30 is no greater than the depth D2 of the concavities 30. Given the stated preferred size of the concavities 30, the density of the concavities 30 is between one and one hundred concavities per square millimeter.

The concavities 30 are formed into the body 22 of the nose pad 20 from the face surface 24 of the nose pad 20. The body 22 of the nose pad 20 is a solid molded element and impervious to air. The body 22 can be molded from a hard plastic, such as high density polyethylene. However, it is preferred that the nose pads 20 be molded from a flexible plastic, such as a polyurethane, or an elastomeric material for additional comfort. A body 22 that is slightly flexible enables the nose pad 20 to conform slightly to the surface of the nose that it contacts. This brings more concavities 30 into contact with the skin of the nose and increases the contact area between the nose pad 20 and the nose.

Figure 5:
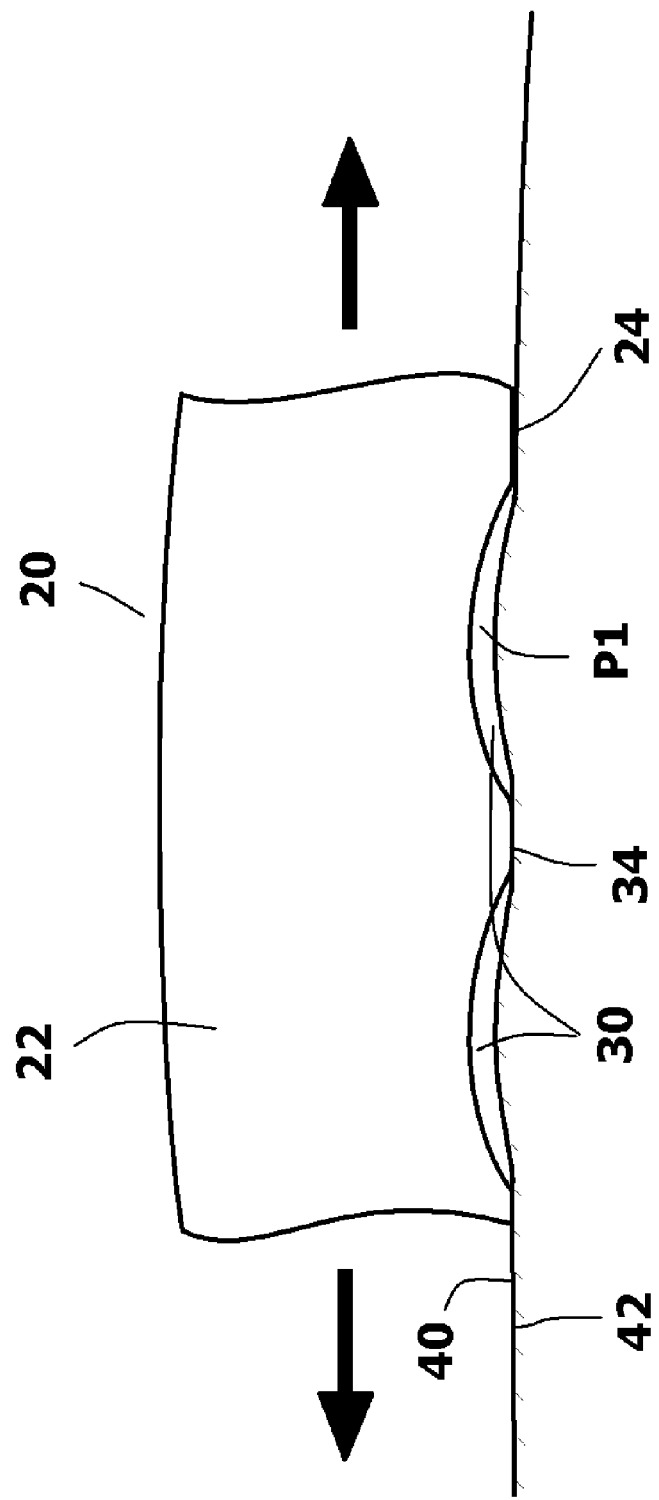
FIG. 5 shows the enlarged view of the section shown in FIG. 4 with the nose pad contacting the skin of the nose.

Referring to FIG. 5 in conjunction with FIG. 4, it can be seen that when the nose pad 20 contacts the skin 42 of the nose 40, the concavities 30 face the skin 42. The segments 34 of the face surface 24 around each of the concavities 30 form salient points that slightly press the skin 42. This causes a slight corresponding bulge in the skin 42 within the area of the concavities 30. In other words, the skin 40 of the nose 40 bulges slightly into the areas defined by the concavities 30. The bulges are very slight, wherein each bulge of the skin 42 occupies only a small percentage of the depth of each concavity 30. The deformation of the skin 42 is so small and slight, that the deformations leave no discernable marks on the skin 42. As the face surface 24 of the nose pad 20 moves across the skin 42, the small bulges of skin 42 in each of the concavities 30 move away from the concavities 30. However, the face surface 24 of the nose pad 20 remains in contact with the skin 42 of the nose 40. The movement of the bulges in relation to the location of the concavities 30 creates low pressure areas within each of the concavities 30. The low pressure P1 in each of the concavities 30 is slightly lower in pressure than is the ambient air pressure outside of the nose pad 20. This creates a small suction attraction between the skin 42 and the concavities 30. The suction is very slight, being no greater than a few grams per square centimeter. However, the total area of the concavities 30 in contact with the skin may exceed one half of a square centimeter. As such, the suction can create an equivalent force of a few grams to the nose pad 20. This amount of suction is sufficient to retain the eyeglasses 10 in place on the nose 40 through most normal head motions.

The suction created between the concavities 30 and the skin 42 of the nose 40 does not require an initial downward depression, as do traditional suction cups. Rather, the suction comes from the lateral movement of the skin 42 under the concavities 30 on the nose pad 20. As such, the suction is generated naturally as the nose pads 20 shift on the nose 40. Furthermore, the suction is not significantly affected by the presence of oil and/or sweat. Rather, the presence of oil and/or sweat can facilitate the slight lateral movements of the nose pads 20, which result in the generation of suction.

The face surface 24 of the nose pad 20 may conform to the contours of the nose 40. As such, the concavities 30 can follow the contours of the nose pad 20 without adverse effects. Furthermore, the matrix of concavities 30 covers the face surface 24 of the nose pad 20. Accordingly, no matter what area of the nose pad 20 is touching the nose 40 at any one time, a slight suction interconnection can be created. As such, the eyeglasses 10 are still free to be moved by a wearer. No matter what position in which they are placed, the eyeglasses 10 will be better suited to remain in that position due to the suction connection created against the skin 42 of the nose 40.

In the previous embodiment, the face surface of the nose pad is formed with air impervious concavities to increase the interconnection between the nose pads and the skin of the nose. The same technology can also be used on other parts of the eyeglasses that contact the user. In some specialty eyeglasses, the eyeglasses touch the forehead when lifted above the eyes to rest upon the head. The point of contact with the forehead can contain the concavities.

Figure 6:
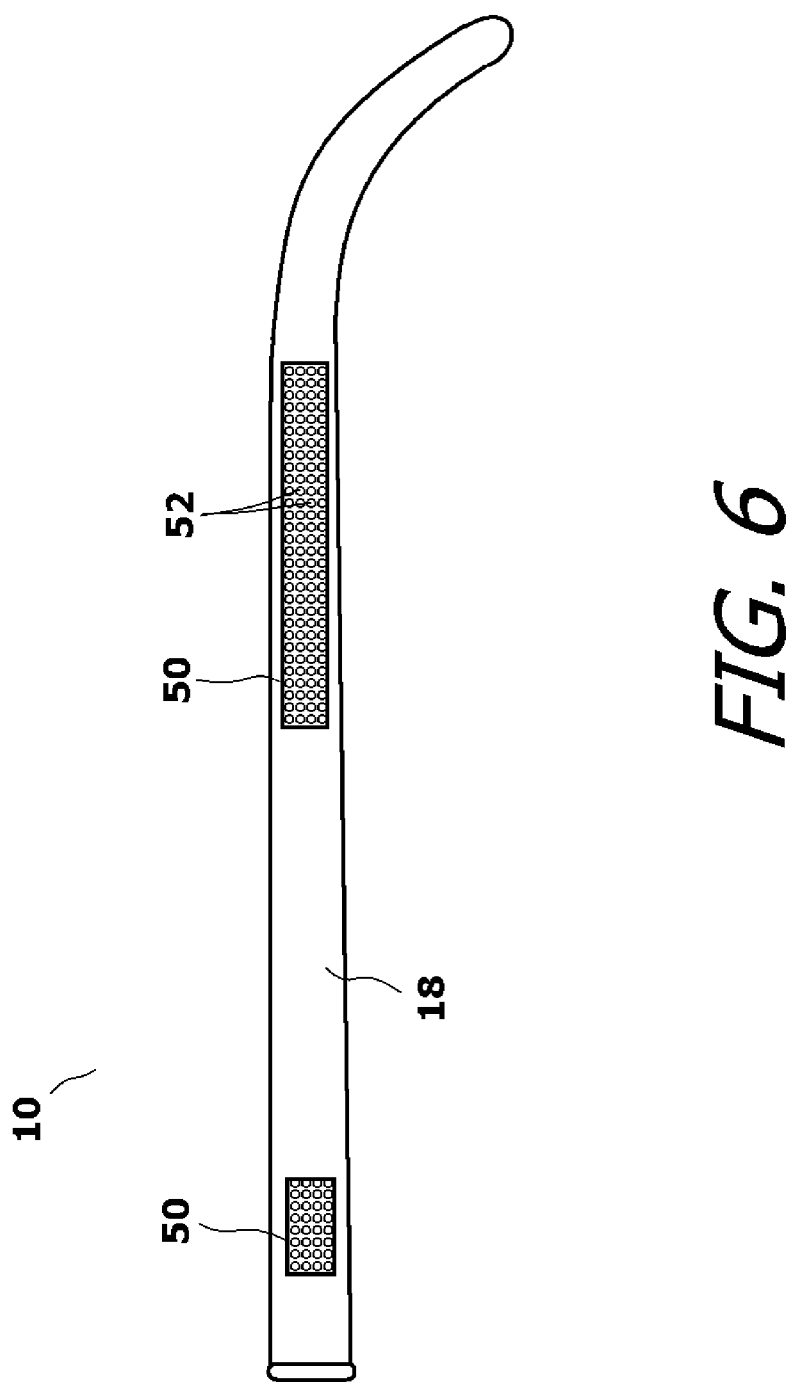
FIG. 6 shows skin contact pads applied to the temple elements of the eyeglasses.

Referring to FIG. 6, it can be seen that pads 50 can be added to the temple elements 18 of the eyeglasses 10 that touch hairless skin. When eyeglasses 10 are worn, the temple elements 18 pass across the temple of the face as well as the top of the ear. Both of these surfaces are typically hairless surfaces with exposed skin. A matrix of concavities 52 is formed on the pads 50. The concavities 52 have the same shape and form as the concavities of the prior described nose pad 20. As such, the concavities 52 create a slight suction against the skin for the reasons previously described. The slight suction helps keep the temple element 18 in place against the skin.

Figure 7:
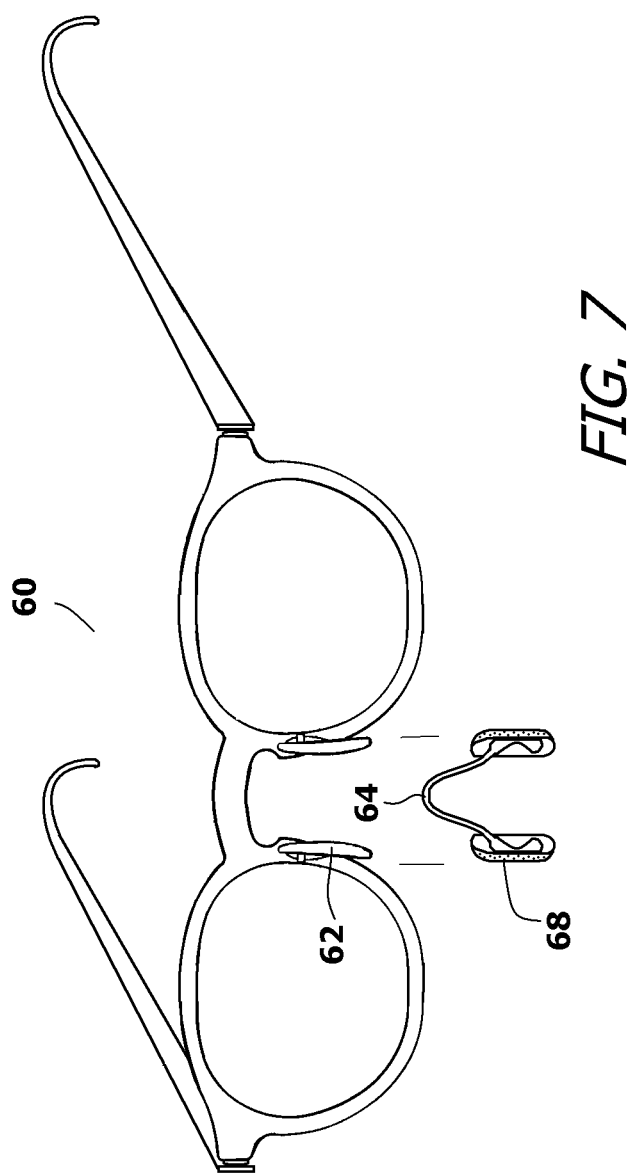
FIG. 7 shows a retroactive assembly that can be applied to a standard set of eyeglasses.

Referring to FIG. 7, an ordinary set of prior art eyeglasses 60 are shown. The eyeglasses 60 have standard nose pads 62. An attachment clip 64 is provided that retroactively attaches to the standard nose pads 62. The attachment clip 64 contains padded face surfaces 66 that are covered in a matrix of concavities 68. The concavities 68 adhere to any skin they touch in the manner previously described. Although an attachment clip 64 is shown that contacts the nose, other attachment clips can be provided that contact the temples or other parts of the head, such as the forehead.

It will be understood that the embodiments of the present invention that are illustrated and described are merely exemplary and that a person skilled in the art can make many variations to those embodiments. For example the present invention can be applied to any style of eyeglasses of sunglasses with nose pads and/or temples that contact the bare skin of the wearer. All such embodiments are intended to be included within the scope of the present invention as defined by the claims.

What is claimed is:

1. A nose pad for eyeglass frames, comprising:
a body having a face surface;
a plurality of concavities formed in said face surface of said body, wherein each of said plurality of concavities has a concave surface defined within an encompassing circular base, wherein said encompassing circular base has a diameter no greater than one millimeter and said concave surface has a depth no greater than half said diameter, wherein each said concave surface is impervious to air.

2. The nose pad according to claim 1, wherein said plurality of concavities have a density of between one and one hundred of said plurality of concavities per square millimeter on said face surface of said nose pad.

3. The nose pad according to claim 1, wherein said plurality of concavities includes adjacent concavities, wherein a minimum distance occurs between said adjacent concavities on said face surface of said nose pad, wherein said minimum distance is no greater than half of said depth.

4. The nose pad according to claim 1, wherein each said encompassing circular base has a rounded edge where said encompassing circular base transitions to said face surface of said nose pad.

5. The nose pad according to claim 1, wherein said plurality of concavities is disposed in an area on said face surface of said nose pad.

6. The nose pad according to claim 5, wherein said area is between four square millimeters and twenty square millimeters.

7. The nose pad according to claim 1, wherein said body of said nose pad is formed from elastomeric material.

8. An eyeglass assembly, comprising:
a front frame;
temple elements coupled to said front frame;
nose pads connected to said front frame, wherein each of said nose pads has a face surface;
a plurality of concavities formed in an area on said face surface, wherein each of said plurality of concavities has a concave surface defined with an encompassing circular base, wherein said encompassing circular base has a maximum diameter no greater than one millimeter and said concave surface has a depth no greater than half said diameter.

9. The assembly according to claim 8, wherein each said concave surface is impervious to air.

10. The assembly according to claim 8, wherein said area has a density of between one and one hundred of said plurality of concavities per square millimeter.

11. The assembly according to claim 8, wherein said plurality of concavities includes adjacent concavities, wherein a minimum distance occurs between said adjacent concavities on said face surface, wherein said minimum distance is no greater than half of said depth.

12. The assembly according to claim 8, wherein each said encompassing circular base has a rounded edge where said encompassing base transitions to said face surface.

13. The assembly according to claim 8, wherein said area is between four square millimeters and twenty square millimeters.

14. The assembly according to claim 8, wherein said body of said nose pad is formed from elastomeric material.

15. A skin contact pad for eyeglass frames, comprising:
a body having a face surface;
a plurality of concavities formed in an area on said face surface of said body, wherein each of said plurality of concavities has a concave surface defined within an encompassing circular base, wherein said encompassing circular base has a maximum diameter no greater than one millimeter and said concave surface has a depth no greater than half said diameter, wherein each said encompassing circular base is independent and complete.

16. The pad according to claim 15, wherein said plurality of concavities has a density in said area of between one and one hundred of said plurality of concavities per square millimeter.

17. The pad according to claim 15, wherein said plurality of concavities includes adjacent concavities, wherein a minimum distance occurs between said adjacent concavities on said face surface, wherein said minimum distance is no greater than half of said depth.

18. The pad according to claim 15, wherein each said encompassing circular base has a rounded edge where said encompassing circular base transitions to said face surface.

* * * * *